(12) United States Patent
Cho et al.

(10) Patent No.: US 9,524,057 B2
(45) Date of Patent: Dec. 20, 2016

(54) PORTABLE DISPLAY DEVICE AND METHOD OF CONTROLLING THEREFOR

(71) Applicant: LG ELECTRONICS INC., Seoul (KR)

(72) Inventors: Eunhyung Cho, Seoul (KR); Doyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/509,624

(22) Filed: Oct. 8, 2014

(65) Prior Publication Data

US 2015/0370413 A1 Dec. 24, 2015

(30) Foreign Application Priority Data

Jun. 18, 2014 (KR) ........................ 10-2014-0074156

(51) Int. Cl.
*G06F 3/041* (2006.01)

(52) U.S. Cl.
CPC ........... *G06F 3/0418* (2013.01); *G06F 3/0414* (2013.01); *G06F 2203/04102* (2013.01)

(58) Field of Classification Search
CPC .... G06F 3/016; G06F 3/0414; G06F 3/04812; G06F 2203/04105; G06F 3/0418; G06F 2203/04102
See application file for complete search history.

(56) References Cited

U.S. PATENT DOCUMENTS

| | | | |
|---|---|---|---|
| 7,109,967 B2 | 9/2006 | Hioki et al. | |
| 7,443,380 B2 | 10/2008 | Nozawa | |
| 7,880,718 B2 | 2/2011 | Cradick et al. | |
| 8,502,788 B2 | 8/2013 | Cho | |
| 8,587,539 B2 | 11/2013 | Tziortzis et al. | |
| 2004/0008191 A1 | 1/2004 | Poupyrev et al. | |
| 2008/0303782 A1 | 12/2008 | Grant et al. | |
| 2009/0219247 A1 | 9/2009 | Watanabe et al. | |
| 2010/0011291 A1 | 1/2010 | Nurmi | |
| 2010/0117975 A1 | 5/2010 | Cho | |
| 2010/0141605 A1 | 6/2010 | Kang et al. | |
| 2011/0057873 A1 | 3/2011 | Geissler et al. | |
| 2012/0112994 A1 | 5/2012 | Vertegaal et al. | |
| 2012/0169609 A1 | 7/2012 | Britton | |
| 2012/0229400 A1* | 9/2012 | Birnbaum et al. | 345/173 |
| 2013/0044240 A1 | 2/2013 | Leskela et al. | |
| 2013/0127606 A1 | 5/2013 | Chang | |
| 2013/0135182 A1 | 5/2013 | Jung et al. | |
| 2013/0145311 A1 | 6/2013 | Joo | |
| 2013/0147706 A1 | 6/2013 | Kim et al. | |
| 2013/0201115 A1 | 8/2013 | Heubel | |
| 2013/0215041 A1 | 8/2013 | Kim et al. | |
| 2013/0222287 A1* | 8/2013 | Bae et al. | 345/173 |
| 2014/0002402 A1 | 1/2014 | Kang et al. | |
| 2014/0029017 A1 | 1/2014 | Lee et al. | |
| 2014/0035869 A1 | 2/2014 | Yun et al. | |
| 2014/0062976 A1 | 3/2014 | Park et al. | |
| 2014/0068473 A1 | 3/2014 | Jano et al. | |

* cited by examiner

*Primary Examiner* — Matthew Sim
(74) *Attorney, Agent, or Firm* — Birch, Stewart, Kolasch & Birch, LLP

(57) ABSTRACT

A display device detecting pressure of a touch input is disclosed. The display device calibrates the pressure of the touch input based on a distance between a position where the display device is gripped and a position on which the touch input is received. By calibrating the pressure of the touch input, the display device can obtain more precise pressure of a touch input.

18 Claims, 14 Drawing Sheets

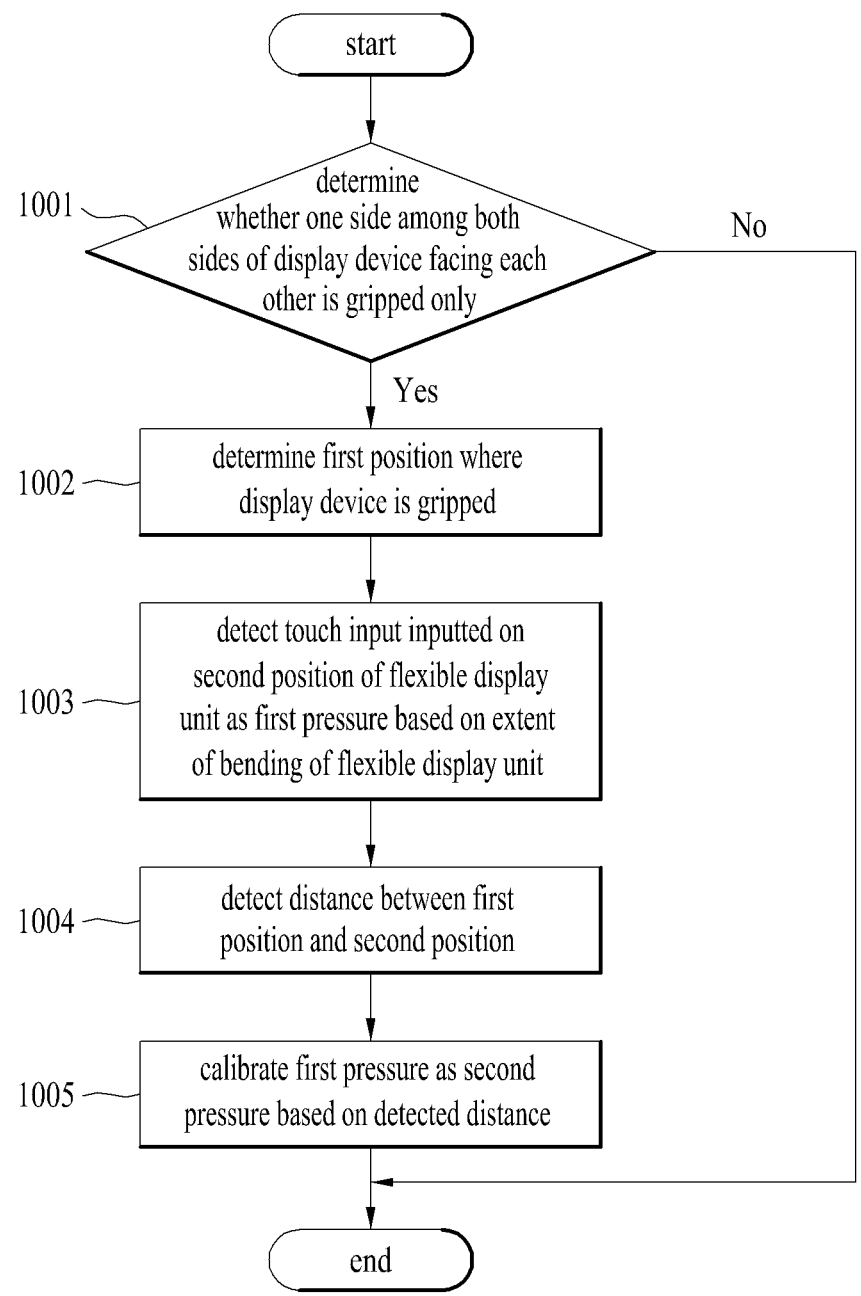

PORTABLE DISPLAY DEVICE AND METHOD OF CONTROLLING THEREFOR

Pursuant to 35 U.S.C. §119(a), this application claims the benefit of the Korean Patent Application No. 10-2014-0074156, filed on Jun. 18, 2014, which is hereby incorporated by reference as if fully set forth herein.

BACKGROUND OF THE INVENTION

Field of the Invention

The present specification relates to a portable display device and a method of controlling therefor.

Discussion of the Related Art

Such a portable display device as a smartphone and a tablet PC is widely disseminated. As functions of the portable display device are diversified, demand for a portable display device equipped with a bigger display is increasing. And, in order to provide the bigger display, a study on various extendible display devices is proceeding. And, in order to extend a display and increase portability at the same time, a study on a flexible display is proceeding as well.

FIG. 1 is a diagram for an example of a display device.

As depicted in FIG. 1, a user of a display device 100 holds the display device 100 by one hand in general. And, the user may touch a point far from a point where the display device is fixed by the hand of the user. In this case, since the point where the display device 100 is fixed is working as a leverage point, the display device 100 is inclined by a touch input of the user. And, as depicted in FIG. 1, in case of the display device 100 equipped with a flexible display, the flexible display may be bent by the touch input of the user. Due to the aforementioned inclination or bending, the touch input of the user may be not properly received. In particular, in case that pressure of the touch input of the user is required, the pressure of the touch input may be recognized as a touch input different from intention of the user.

SUMMARY OF THE INVENTION

Accordingly, the present specification is directed to an apparatus and method thereof that substantially obviate one or more problems due to limitations and disadvantages of the related art.

An object of the present specification is to provide a method of correcting a touch input and an apparatus therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a display device includes a display unit, a touch sensor unit configured to sense a touch input and a processor further configured to determine whether only one side among both sides of the display device facing each other is gripped only, the processor further configured to determine a first position on the display device where the display device is gripped, the processor further configured to detect a touch input inputted on a second position of the display unit as a first pressure, the processor further configured to detect a distance between the first position as a second pressure based on the detected distance, wherein as the detected distance increases, the second pressure increases more than the first pressure.

And, the second pressure is increased from the first pressure in proportion to the detected distance.

And, if the detected distance is greater than a predetermined threshold, the processor can be further configured to calibrate the first pressure as the second pressure.

Meanwhile, if the both sides of the display device lacing each other are gapped, the processor can be further configured to not calibrate the first pressure.

And, the display unit may include a flexible display unit.

And, the display device may further include a beading sensor unit configured to sense an extent of bending of the display device. If the extend of bending of the display device is greater than a predetermined threshold, the processor can be further configured to calibrate the first pressure as the second pressure.

And, the processor can be further configured to detect an axis where the display device is bent using the bending sensor unit and determine the detected axis as the first position.

Meanwhile, the display unit includes at least one selected front a group consisting of an extendible display unit, a rollable display unit, an attachable display unit and a stretchable display unit and if a length of the display unit is greater than a predetermined threshold, the processor can be further configured to calibrate the first pressure as the second pressure.

Meanwhile, the display unit includes a foldable display unit including two or more display areas and if the display unit is unfolded, the processor can be further configured to calibrate the first pressure as the second pressure.

Meanwhile, a pressure of the touch input can be detected by at least one selected from the group consisting of an area of the touch input, a change of voltage of the touch sensor unit by the touch input and a change of charge amount of the touch sensor unit by the touch input.

Meanwhile, the display device further includes a pressure sensor configured to sense a pressure applied on the display device and the processor can be further configured to determine the first position based on a pressure value received from the pressure sensor.

Meanwhile, the display device further includes a second touch unit configured to sense a touch input inputted on a rear side of the display device and the processor can be further configured to determine the first position based on the touch input inputted on the rear side of the display device, which is held for more than a predetermined time.

Meanwhile, the display device further includes a motion sensor unit configured to sense a movement of the display device. If the movement of the display device sensed by the motion sensor unit exceeds a predetermined threshold, the processor can be further configured to calibrate the first pressure as the second pressure and if the movement of the display device sensed by the motion sensor unit is same to or less than the predetermined threshold, the processor can be further configured not to calibrate the first pressure.

And, the motion sensor unit may include at least one of an accelerometer and a gyro sensor.

And, the motion sensor unit includes a camera and the processor can be further configured to determine the movement of the display device based on an image captured by the camera.

And, the movement of the display device may include at least one selected from a group consisting of shaking, bending and skewness.

And, the processor can be further configured to determine the first position based on the sensed movement of the display device.

And, the processor can be further configured to determine a point where the sensed movement of the display device is smallest as the first position.

To further achieve these objects and other advantages and in accordance with the purpose of the invention, as embodied and broadly described herein, according to a different embodiment, a display device includes a flexible display unit, a touch sensor unit configured to sense a touch input, a bending sensor unit configured to sense the extent of bending of the flexible display unit and a processor configured to control the display unit, the touch sensor unit and the bending sensor unit, the processor further configured to determine whether only one side among both sides of the display device facing each other is gripped only, the processor further configured to determine a first position on the display device where the display device is gripped, the processor further configured to detect a touch input inputted on a second position of the display unit as a first pressure based on the extent of bending of the flexible display unit, the processor further configured to detect a distance between the first position and the second position, the processor further configured to calibrate the first pressure as a second pressure based on the detected distance, wherein as the detected distance increases the second pressure decreases less than the first pressure.

To achieve these objects and other advantages and in according with the purpose of the invention, as embodied and broadly described herein, a method of controlling a display device includes the steps of determining whether only one side among both sides of the display device facing each other is gripped only, determining a first position where the display device facing each other is gripped only, determining a first position of the display unit as a first pressure, detecting a distance between the first position and the second position and calibrating the first pressure as a second pressure based on the detected distance, wherein the second pressure can be increased more than the first pressure as the detected distance is getting longer.

According to the aforementioned various embodiments, a display device and a method of controlling therefor according to the present specification can correct pressure of a touch input.

And, more enhanced user experience can be provided by correcting the pressure of the touch input.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 is a flowchart for a method of controlling a display device according to a different embodiment.

DETAILED DESCRIPTION OF THE INVENTION

Figure 1:
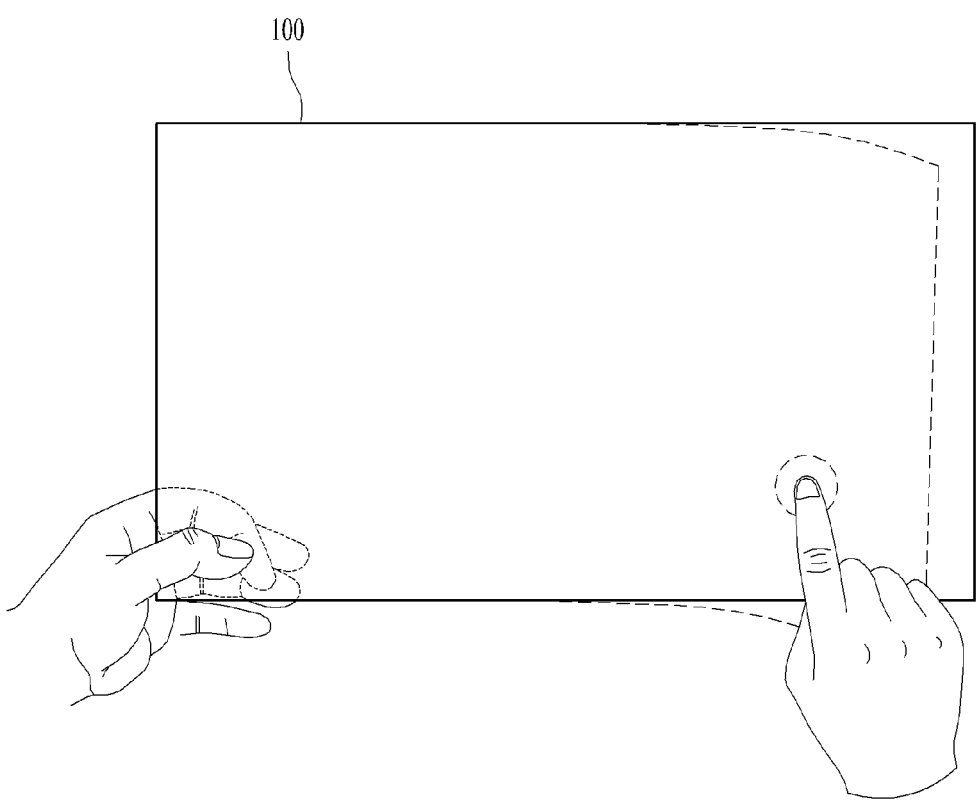
FIG. 1 is a diagram for an example of a display device.

Reference will now be made in detail to the preferred embodiments of the present specification, examples of which are illustrated in the accompanying drawings. While the embodiments have been concretely described with reference to the attached diagrams and the contents written on the diagrams, a scope of claims may be non-restricted or non-limited to the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

And, structural or functional explanations, which are specified for embodiments according to a concept of the present disclosure, are described to explain embodiments according to the concept of the present specification only. Hence, the embodiments according to the concept of the present specification can be implemented in various forms rather than construed as the embodiments explained in the present specification only.

Since the embodiments according to the concept of the present specification can have various modifications and forms, the present specification is explained in a manner of showing examples of specific embodiments in drawings. Yet, the embodiments according to the concept of the present specification may be non-limited to the specified disclosure form. Instead, the embodiments according to the concept of the present specification needs to be construed as the embodiments including ail changes, equivalents or substitutes included in an idea and a technological scope of the present specification.

Moreover, a terminology, each of which includes such an ordinal number as first, second and the like, may be used to describe various components. In doing so, the various components should be non-limited by the corresponding terminologies, respectively. The terminologies are only used for the purpose of discriminating one component from other components. For instance, a first component may be named a second component while coming within the scope of the appended claims and their equivalents. Similarly, the second component may be named the first component.

In the present application, such a terminology as 'comprise', 'include' and the like should be construed not as necessarily excluding various components or steps written in the present specification but as including the components or steps in part or further including additional components or steps. And, such a terminology as 'unit' written in the present specification indicates a unit processing at least one function or an operation and can be implemented by hardware, software or a combination thereof.

As mentioned earlier with reference to FIG. 1, when a display device is gripped by one hand, pressure of a touch input of a user may be wrongly recognized.

Figure 2:
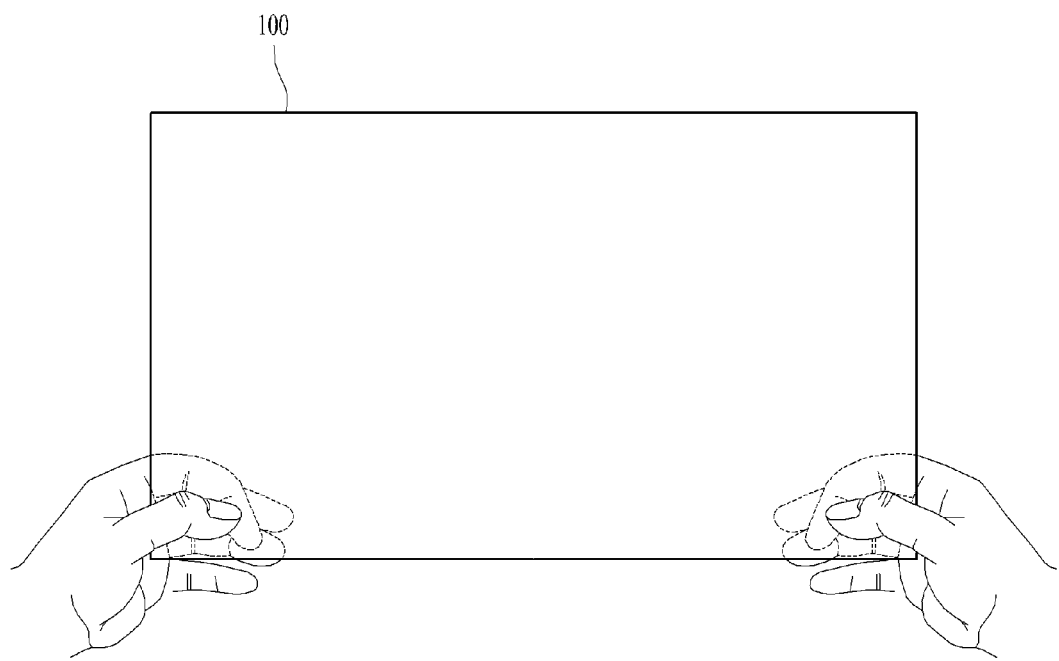
FIG. 2 is a diagram for a display device gripped by both hands.

FIG. 2 is a diagram for a display device gripped by both hands.

Referring to FIG. 2, both sides (a left side and a right side) of a display device 100 facing each other are gripped by both hands. Since both sides of the display device 100 facing each other are fixed, there exists a low possibility of wrongly recognizing a touch input inputted on the display device. Hence, a calibration method of a touch input, which is described later, may be performed when only one side among the both sides of the display device facing each other is gripped. Meanwhile, although the display device 100 is gripped by both hands, a calibration of a touch input may be required. For instance, a left side and a bottom side of the display device 100 may be gripped. In this case, a calibration may be required for a touch input inputted on a top-right side of the display device 100. In the following description, configuration and operations of the display device 100 according to the present specification are explained with reference to drawings.

Figure 3:
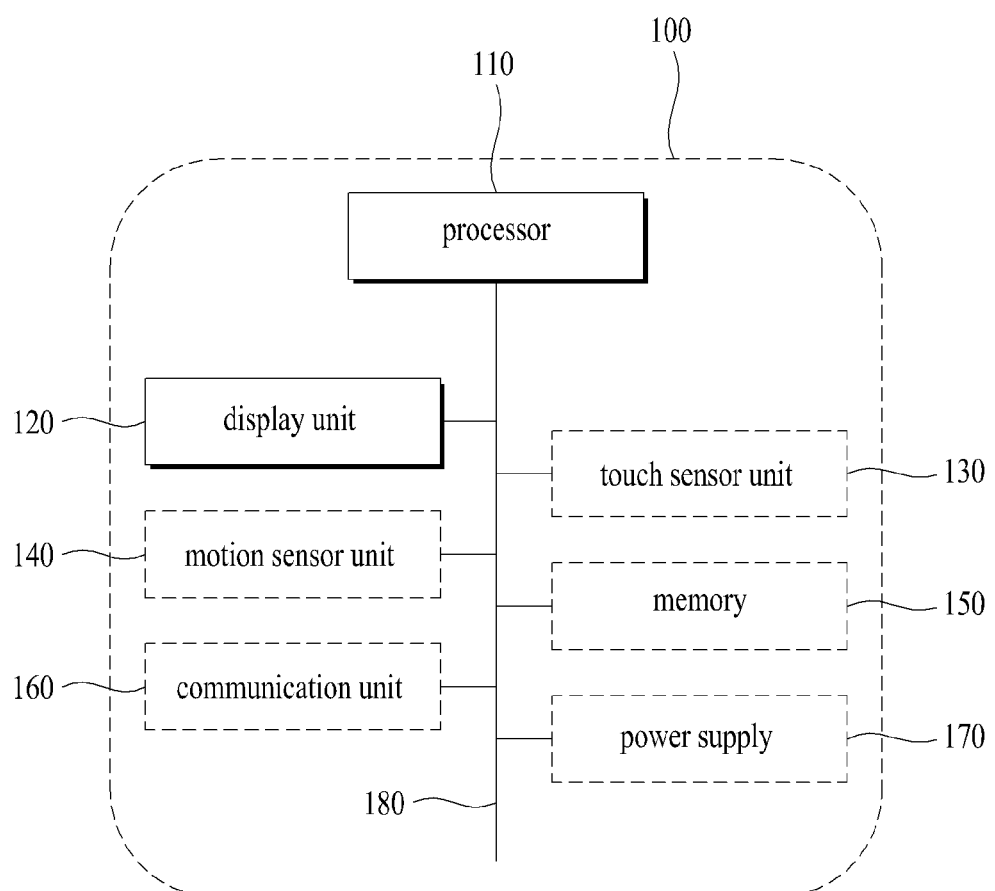
FIG. 3 is a diagram for a display device according to one embodiment.

FIG. 3 is a diagram for a display device according to one embodiment.

The display device 100 can include a display unit 120, a touch sensor unit 130 configured to sense a touch input and a processor configured to control the display unit 120 and the touch sensor unit 130. The display unit 120 may include a flexible display unit. As described later with reference to FIGS. 4a to 4e, the display unit can include various form factors. And, the touch sensor unit 130 can sense a touch input according to at least one of a capacitive touch sensor and a resistive touch sensor. The touch sensor unit 130 can be positioned on the display unit 120 or can be positioned inside of the display unit 120. And, the display device 100 can further include different components not depicted in FIG. 3. For instance, the display device 100 may further include a pressure sensor configured to sense pressure applied on the display device 100.

The display device 100 may further include a motion sensor unit 140 configured to sense at least one selected from a group consisting of shaking, bending and skewness of the display device. For instance, the motion sensor unit 140 may include at least one of an accelerometer and a gyro sensor. And, for instance, the motion sensor unit may include a camera. And, the display device 100 may determine a movement of the display device 100 based on a captured image.

Also, the display device 100 may further include a memory 150 configured to store commands executable by the processor. And, the display device 100 may further include a communication unit 160 configured to communicate with an external device. And, the display device 100 may further include a power supply 170. In embodiment of FIG. 3, components represented by dotted line are not essential parts of the display device 100. For instance, the display device 100 may include a separate external memory and power may be supplied to the display device from an external power supply.

FIGS. 4a to 4e are diagrams for different examples of a display device.

Figure 4A:
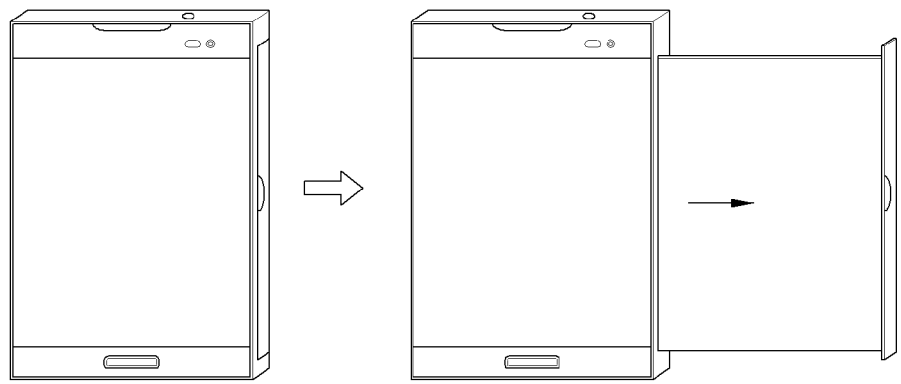
FIG. 4a to 4e are diagrams for different examples of a display device.
Figure 4B:
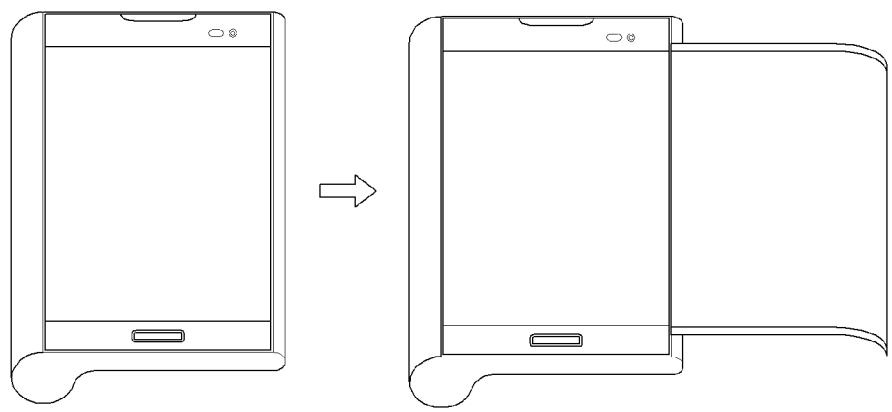
Figure 4C:
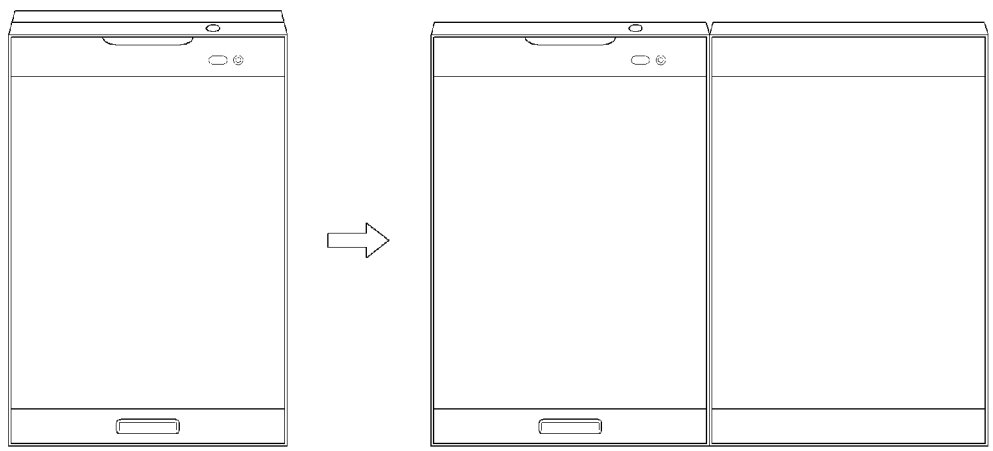
Figure 4D:
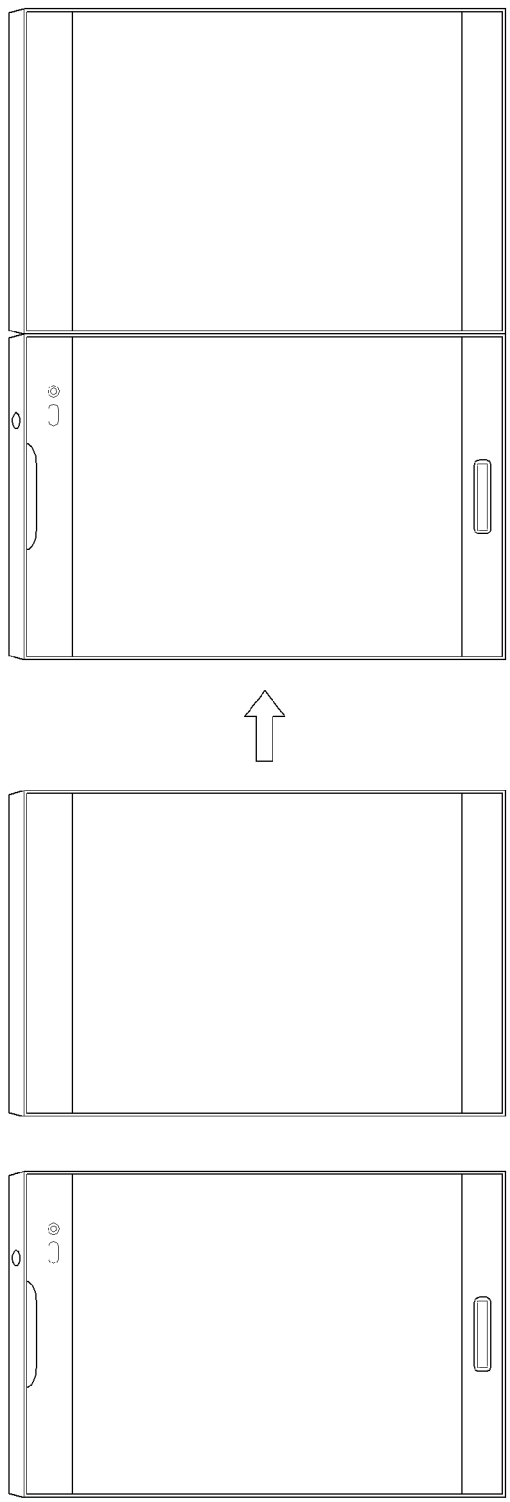
Figure 4E:
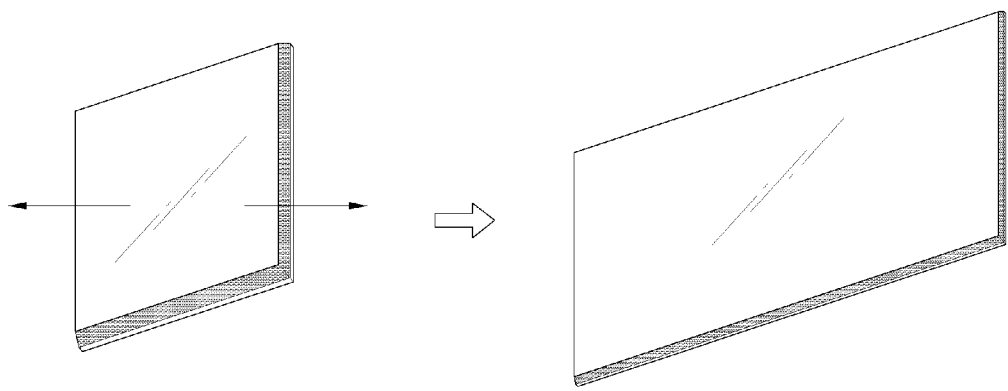

The display device 100 depicted in FIG. 1 corresponds to a flexible display. Yet, the display device 100 can include various form factors. For instance, as shown in FIG. 4a, the display device 100 may include an extendible display. And, as depicted in FIG. 4b, the display device may include a rollable display. And, as depicted in FIG. 4c, the display device may include a foldable display. And, as depicted in FIG. 4d, the display device may include an attachable display. And, as shown in FIG. 4e, the display device may include a stretchable display.

In the foregoing description, configuration of the display device and various form factors are explained. Various embodiment of the display device are explained in the following description. Those skilled in the art can understand that the aforementioned display device configuration and form factors mentioned earlier with reference to FIG. 1 to FIG. 4e can be combined with the following embodiments.

Figure 5A:
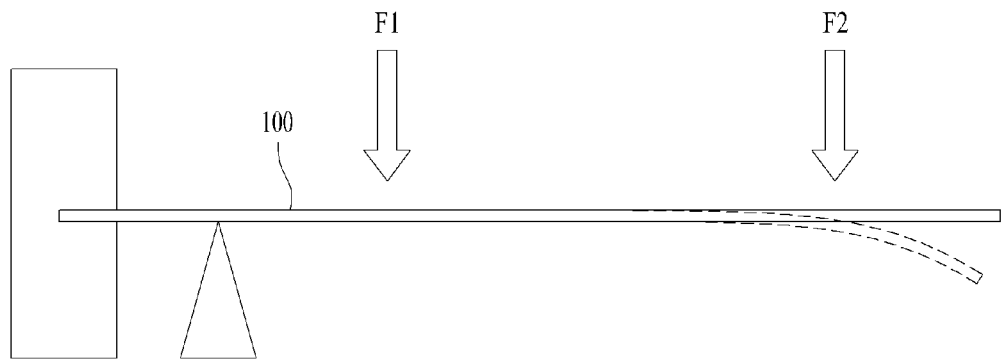
FIGS. 5a and 5b are diagrams for an error of a touch input inputted on a display device by the touch input.
Figure 5B:
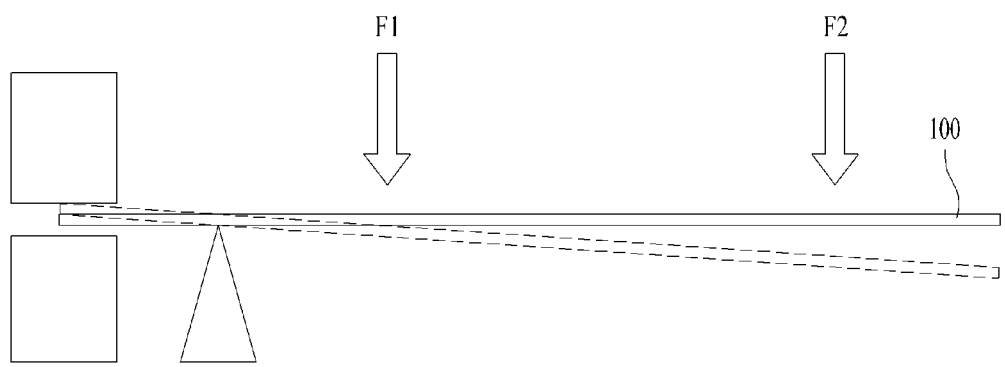

FIGS. 5a and 5b are diagrams for an error of a touch input inputted on a display device by the touch input.

Referring to FIGS. 5a and 5b, a grip of the display device 100 is simplified by a fixed point located at the left of the display device 100 and a leverage point located at the right of the fixed point. This corresponds to a case that a user holds the display device 100 by one hand.

Referring to FIG. 5a, a left side of the display device 100 is fixed. And, the leverage point is formed in a manner of being adjacent to the fixed point. For instance, in case that a user grips the left side of the display device 100 by one hand, the fixed point and the leverage point shown in FIG. 5a can be formed. In FIG. 5a, pressure of two touch inputs (F1 and F2) are identical to each other. Yet, a touch input F2 is farther from the fixed point and the leverage point compared to a touch input F1. Hence, since the display device 100 is bendable, the pressure of the touch input F2 may be recognized as smaller than the pressure of the touch input F1. This may similarly occur in all elastic displays including the flexible display.

On the contrary, FIG. 5b shows a display device 100, which is assumed to have no elasticity. Yet, the display device 100 has a loose fixed point. This is caused by the display device 100, which, is not completely fixed when the display device 100 is gripped by a hand. Hence, as depicted in FIG. 5b, a movement of the display device 100 occurs due to touch inputs (F1 and F2). A touch input F2 is farther from the fixed point compared to a touch input F1. Although the touch input F1 and the touch input F2 correspond to the touch inputs touched by identical power, the display device 100 moves more by the touch input F2. Hence, pressure of the touch input F2 may be recognized as smaller than the touch input F1.

As mentioned earlier with reference to FIG. 5a and FIG. 5b, as a point on which a touch input is received is getting far from a point where the display device 100 is gripped, pressure of the touch input may be recognized as getting smaller. Hence, the display device 100 determines whether only one side among both sides of the display device 100 facing each other is gripped and may be then able to detect the point where the display device is gripped. If one side of the display device is gripped only, the display device 100 can calibrate the pressure of the touch input. When only one side among both sides of the display device 100 facing each other is gripped, if a touch input is received on the display device 100, the pressure of the touch input can be calibrated based on a distance between a position where the display device 100 is gripped and a position on which the touch input is received. In this case, as the distance between the position where the display device 100 is gripped and the position on which the touch input is received is getting longer, the pressure of the received touch input can be calibrated to be increased more.

Figure 6:
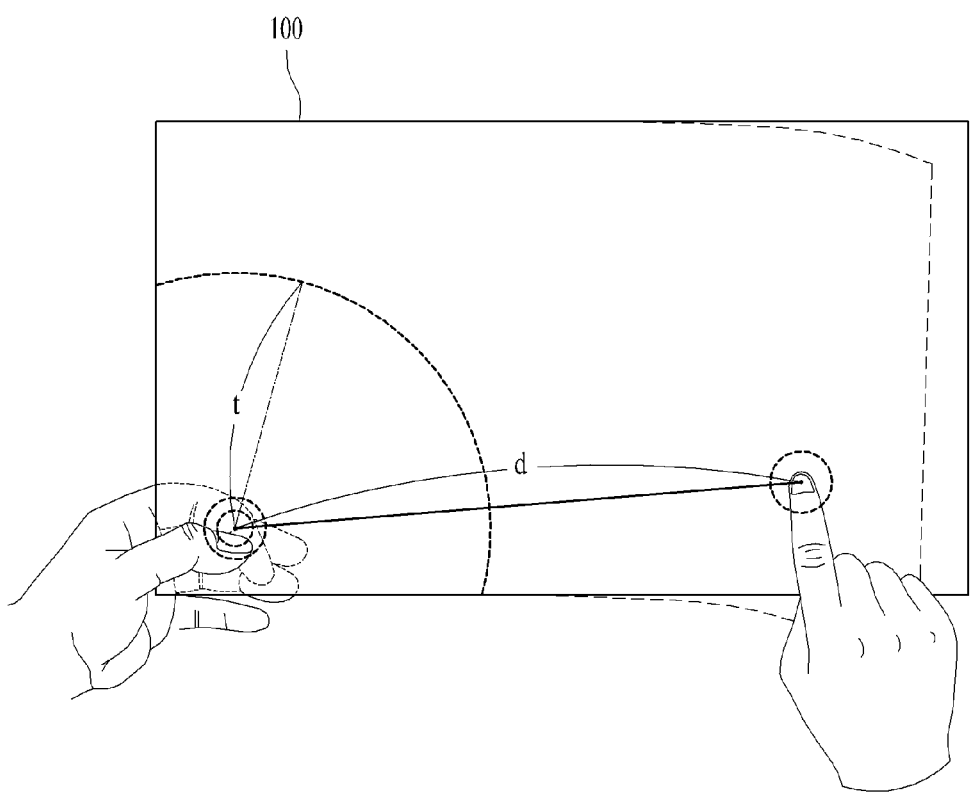
FIG. 6 is a diagram for a calibration of a touch input inputted on a display device according to a distance.

FIG. 6 is a diagram for a calibration of a touch input inputted on a display device according to a distance.

The display device 100 can be configured to detect pressure of a touch input. The display device 100 may detect the pressure of the touch input based on an area of the touch input, a change of voltage of the touch, sensor unit 130 by the touch input and/or a change of charge amount of the touch sensor unit 130 by the touch input. And, the display device 100 can include a pressure sensor configured to sense pressure applied on the display device 100. Yet, as mentioned earlier with reference to FIG. 5a and FIG. 5b, it may be necessary to calibrate the pressure of the sensed touch input.

And, the display device 100 can determine a position where the display device 100 is gripped. For instance, the display device 100 may determine the position where the display device 100 is gripped using a pressure sensor configured to receive pressure applied on the display device 100. In this case, the display device 100 may determine the position where the display device 100 is gripped based on a strength of the pressure, a time of maintaining the pressure and/or a position of the pressure. And, the display device 100 may determine the position where the display device 100 is gripped by sensing a touch input touching a rear side of the display device. For instance, when the display device 100 is gripped by one hand, a user touches at least a part of the rear side of the display device 100. Hence, the display device 100 can determine the position where the display device 100 is gripped base don the touch input holding the rear side of the display device 100 for more than a predetermined time. Meanwhile, when a movement of the display device 100 is small, the display device can determine it as the display device 100 is sufficiently fixed or the display device 100 is not gripped by one hand. And, the display device 100 can determine the position where the display device 100 is gripped based on the movement of the display device 100. For instance, the display device 100 can determine a point where the movement of the display device 100 is smallest as the point where the display device 100 is gripped.

Referring to FIG. 6, a touch input is received on a point far from the point where the display device 100 is gripped as far as a distance d. As mentioned earlier with reference to FIGS. 5a and 5b, as the distance d is getting longer, pressure of the received touch input may be increased more. For instance, the display device 100 may increase the pressure of the received touch input in proportion to the distance d. And, the display device 100 may perform a predefined pressure calibration in relation to the distance d.

Meanwhile, the display device 100 may perform a calibration when a touch input is far from the point where the display device is gripped more than a prescribed distance only. For instance, as depicted in FIG. 6, the display device 100 may perform a calibration when a touch input is far from the point where the display device is gripped more than a predetermined threshold T only.

And, as depicted in FIG. 2, when the both sides of the display device 100 facing each other are gripped, the display device 100 may not calibrate pressure of a touch input.

And, as shown in FIG. 6, the display device 100 may include a flexible display unit. The display device 100 may further include a bending sensing unit, configured to sense the extent of bending of the display device 100. And, if the extent of bending of the display device is greater than a predetermined threshold, the display device 100 may calibrate the pressure of the touch input.

Figure 7:
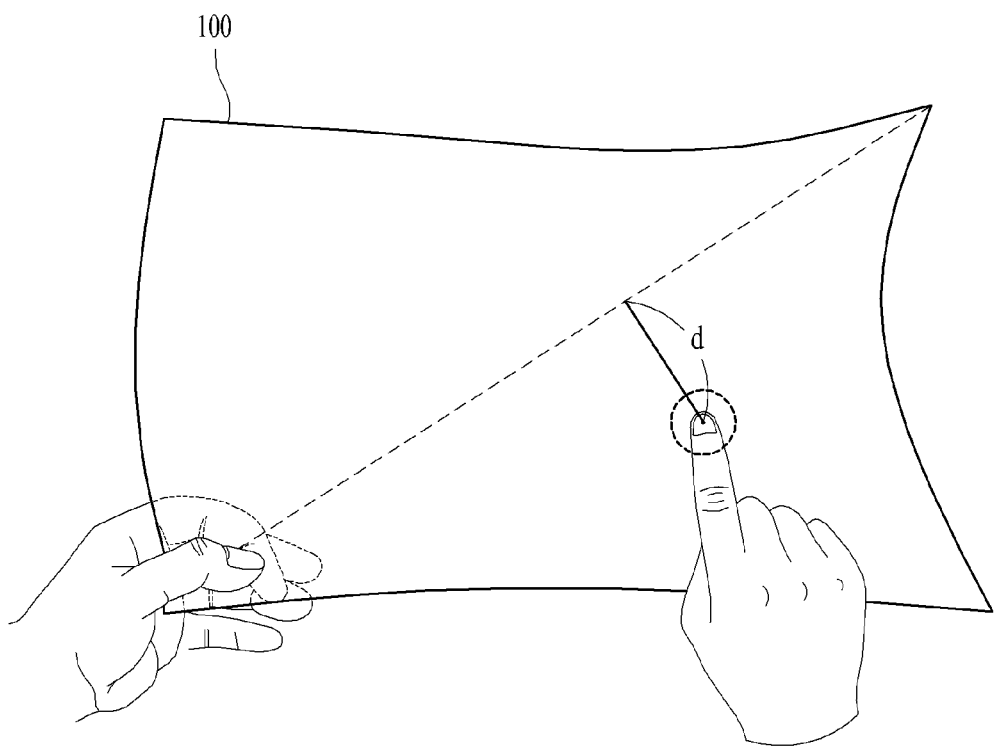
FIG. 7 is a diagram for a display device which is bent according to one axis.

FIG. 7 is a diagram for a display device which is bent according to one axis.

Referring to FIG. 7, the display device 100 is bent according to one axis. In general, an axis is less affected by a touch input. Hence, the axis where the display device 100 is bent may be regarded as a set of a series of fixed points. In this case, the display device 100 may detect the axis where the display device 100 is bent and calibrate pressure of the touch input based on a distance (d) between the axis and the touch input.

Meanwhile, the display device 100 may include a display unit of a variable length. Referring back to FIGS. 4a to 4e again, the display device 100 may include an extendible display, a rollable display, a foldable display, an attachable display and/or a stretchable display. This sort of display may have variable length. And, if a length of the display unit is extended more than a predetermined threshold, the display device 100 can be configured to calibrate pressure of a touch input. For instance, the display deuce 100 including a foldable display may calibrate the pressure of the touch input when the display device 100 is unfolded.

Referring back to FIG. 6 again, the display device 100 may further include a motion sensor unit configured to sense a movement of the display device 100. The display device 100 may determine whether there exist a movement of the display device 100 based on the motion sensor unit. If the movement of the display device 100 is very little, the display device may be sufficiently fixed, for instance, when the display device 100 is laid on a flat floor, the display device 100 may not perform a calibration for pressure of a touch input. Hence, the display device 100 may perform the calibration for the pressure of the touch input when the movement of the display device 100 exceeds a predetermined threshold only.

Figure 8:
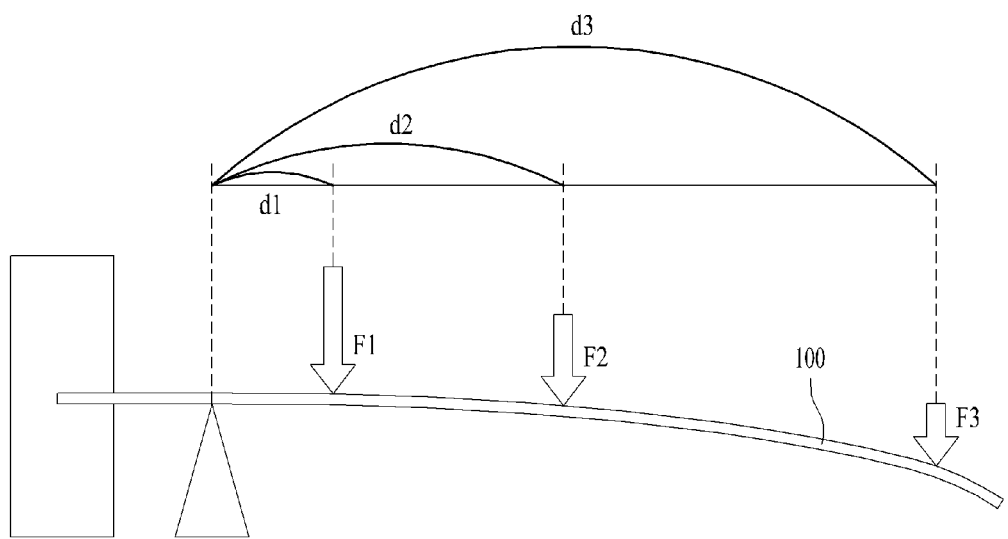
FIG. 8 is a diagram for power of a touch input which is required according to a distance in the same extent of bending.

FIG. 8 is a diagram for power of a touch input which is required according to a distance in the same extent of bending.

The display device 100 sending pressure of a touch input is mentioned earlier with reference to FIGS. 4 to 7. Yet, the display device 100 may sense the pressure of the touch input based on the extent of bending a display unit.

The display device 100 depicted in FIG. 8 includes a flexible display unit, a touch sensor unit and a bending sensor unit configured to sense the extent of bending of a flexible display unit. And, the display device 100 may further include a processor. And, the display device shown in FIG. 8 may include the components mentioned earlier with reference to FIG. 3. The display device 100 depicted in FIG. 8 can sense pressure of a touch input based on the bending sensor unit. And, if the extent of bending is getting bigger, the display device 100 may determine it as the pressure of the touch input is bigger.

Yet, as depicted in FIG. 8, if a touch input is getting far from a fixed point and a leverage point, an identical extent of bending can be obtained by a smaller power. In particular, as shown in FIG. 8, in order to bend the display device 100, a power as much as F1 is required in a distance d1. On the contrary, in a distance d3, the display device can be bent by a power as much as F3, which is smaller than the F1. Hence, in case of sensing the pressure of the touch input by the extent of bending, the display device 100 can calibrate the pressure of the received touch input to be smaller as a distance between a position where the display device 100 is gripped and a position on which the touch input is received is getting longer.

Hence, the display device 100 depicted in FIG. 8 calibrates the pressure of the touch input in contrast with the display device shown in FIGS. 4 to 7. Yet, the calibration method of the touch input mentioned earlier with reference to FIGS. 4 to 7 can be similarly applied to the display device 100 shown in FIG. 8 as well. For instance, the display device shown in FIGS. 4 to 7 calibrates the pressure of the received touch input in proportion to a distance between a position where the display device is gripped and a position on which the touch input is received. On the contrary, the display device 100 shown in FIG. 8 may calibrate the pressure of the received touch input in reverse proportion to the distance between the position where the display device is gripped and the position on which the touch input is received. And, those skilled in the art may understand that contends mentioned earlier with reference to FIGS. 1 to 7 can be similarly applied to the display device 100 shown in FIG. 8 as well.

Figure 9:
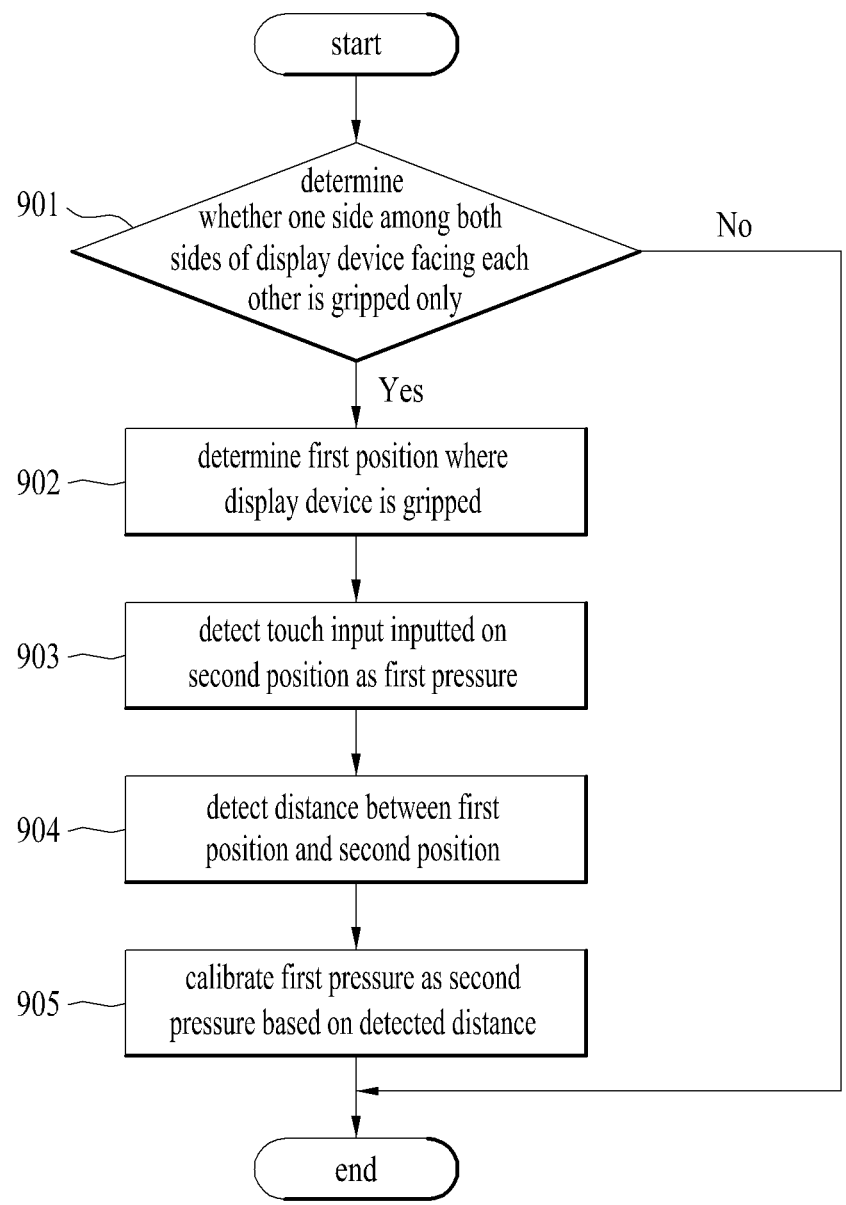
FIG. 9 is a flowchart for a method of controlling a display device according to one embodiment.

FIG. 9 is a flowchart for a method of controlling a display device according to one embodiment.

As mentioned earlier with reference to FIG. 1 to FIG. 4e, the display device can include various configurations and form factors. The display device determines whether one side among both sides of the display device facing each other is gripped only [901]. If one side is gripped only, the display device determines a first position where the display device is gripped [902]. As mentioned earlier with reference to FIG. 6 and FIG. 7, the display device can determine the position where the display device is gripped using various methods. The display device detects a touch input inputted on a second position of a display unit as a first pressure [903]. As mentioned earlier with reference to FIG. 6, the display device can detect the pressure of the touch input using various methods. The display device detects a distance between the first position and the second position [904] and calibrates the first pressure as a second pressure based on the detected distance [905]. In this case, the second pressure is increased more than the first pressure as the detected distance is getting longer. As mentioned earlier with reference to FIG. 6 and FIG. 7, the display device can calibrate the first pressure (pressure of the touch input) as the second pressure based on various criteria.

FIG. 10 is a flowchart for a method of controlling a display device according to a different embodiment.

FIG. 10 is a flowchart for a method of controlling a display device corresponding to the display device 100 shown in FIG. 8. As mentioned earlier with reference to FIG. 8, configuration of the display device mentioned earlier with reference to FIG. 1 to FIG. 7 and a method of controlling therefor can be applied to the display device depicted in FIG. 8. Hence, explanation of the duplicated configuration is omitted at this time. If it is determined that one side among both sides of the display device facing each other is gripped [1001], the display device shown in FIG. 10 determines a first position where the display device is gripped [1002]. And, the display device includes a flexible display unit and detects a touch input inputted on a second position of the flexible display unit as a first pressure based on the extent of bending of the flexible display unit [1003]. In particular, the display device depicted in FIG. 10 detects the pressure of the touch input according to the extent of bending of the flexible display unit. And, the display device detects a distance between the first position and the second position [1004] and calibrates the first pressure (pressure of the touch input) as a second pressure based on the detected distance [1005]. In this case, the second pressure is decreasing less than the first pressure as the detected distance is getting longer.

A display device according to the present specification and a method of controlling therefor may not limitedly apply to the composition and method of the aforementioned embodiments. The aforementioned embodiments may be configured in a manner of being selectively combined the whole of the embodiments or a part of the embodiments to achieve various modifications.

Meanwhile, a display device according to the present specification and a method of controlling therefor can be implemented with a software readable by a processor in a recording media readable by the processor, which is equipped in the display device. The recording media readable by the processor may include all kinds of recording devices for storing data capable of being read by the processor. The examples of the recording media readable by the processor may include a ROM, a RAM, a CD-ROM, a magnetic tape, a floppy disc, an optical data storing device and the like. The recording media readable by the processor are distributed to the computer systems connected by a network and codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A display device, comprising:
a display unit;
a touch sensor unit configured to sense a touch input; and
a processor configured to control the display unit and the touch sensor unit,
wherein the processor is further configured to:
determine whether only one side among both sides of the display device facing each other is gripped,
determine a first position on the display device where the display device is gripped,
detect a touch input inputted on a second position of the display unit as a first pressure,
detect a distance between the first position and the second position, and
calibrate the first pressure of the touch input to a second pressure based on the detected distance,
wherein the second pressure is increased from the first pressure in proportion to the detected distance,
wherein the first position is a grip position inputting a grip touch, and
wherein the touch input is input on the second position while the grip touch is maintained on the first position.

2. The display device of claim 1, wherein the processor is further configured to, if the detected distance is greater than a predetermined threshold, calibrate the first pressure as the second pressure.

3. The display device of claim 1, wherein the processor is further configured to, if the both sides of the display device facing each other are gripped, not calibrate the first pressure.

4. The display device of claim 1, wherein the display unit comprises a flexible display unit.

5. The display device of claim 4, further comprising a bending sensor unit configured to sense an extent of bending of the display device,
wherein the processor is further configured to, if the extent of bending of the display device is greater than a predetermined threshold, calibrate the first pressure as the second pressure.

6. The display device of claim 5, wherein the processor is further configured to detect an axis where the display device is bent using the bending sensor unit and determine the detected axis as the first position.

7. The display device of claim 1,
wherein the display unit comprises at least one selected from a group consisting of an extendible display unit, a rollable display unit, an attachable display unit and a stretchable display unit, and
wherein the processor is further configured to, if a length of the display unit is greater than a predetermined threshold, calibrate the first pressure as the second pressure.

8. The display device of claim 1,
wherein the display unit comprises a foldable display unit containing two or more display areas, and
wherein the processor is further configured to, if the display unit is unfolded, calibrate the first pressure as the second pressure.

9. The display device of claim 1, wherein a pressure of the touch input is detected by at least one selected from the group consisting of an area of the touch input, a change of voltage of the touch sensor unit by the touch input and a change of charge amount of the touch sensor unit by the touch input.

10. The display device of claim 1, further comprising a pressure sensor configured to sense a pressure applied on the display device, wherein the processor is further configured to determine the first position based on a pressure value received from the pressure sensor.

11. The display device of claim 1, further comprising a second touch unit configured to sense a touch input inputted on a rear side of the display device, wherein the processor is further configured to determine the first position based on the touch input inputted on the rear side of the display device, which is held for more than a predetermined time.

12. The display device of claim 1, further comprising a motion sensor unit configured to sense a movement of the display device,
wherein the processor is further configured to:
if the movement of the display device sensed by the motion sensor unit exceeds a predetermined threshold, calibrate the first pressure as the second pressure, and
if the movement of the display device sensed by the motion sensor unit is same to or less than the predetermined threshold, not calibrate the first pressure.

13. The display device of claim 12, wherein the motion sensor unit comprises at least one of an accelerometer and a gyro sensor.

14. The display device of claim 12,
wherein the motion sensor unit comprises a camera, and
wherein the processor is further configured to determine the movement of the display device based on an image captured by the camera.

15. The display device of claim 12, wherein the movement of the display device comprises at least one of shaking, bending and skewness.

16. The display device of claim 12, wherein the processor is further configured to determine the first position based on the sensed movement of the display device.

17. The display device of claim 16, wherein the processor is further configured to determine a point where the sensed movement of the display device is smallest as the first position.

18. A method of controlling a display device containing a display unit and a touch sensor unit, the method comprising:
determining whether only one side among both sides of the display device facing each other is gripped;
determining a first position where the display device is gripped;
detecting a touch input inputted on a second position of the display unit as a first pressure;
detecting a distance between the first position and the second position; and
calibrating the first pressure of the touch input to a second pressure based on the detected distance,
wherein the second pressure is increased from the first pressure in proportion to the detected distance,
wherein the first position is a grip position inputting a grip touch, and
wherein the touch input is input on the second position while the grip touch is maintained on the first position.

* * * * *